United States Patent
Blum et al.

[11] Patent Number: 5,872,613
[45] Date of Patent: *Feb. 16, 1999

[54] METHOD OF MANUFACTURING CONTACT LENSES

[75] Inventors: Ronald D. Blum, Roanoke, Va.; Amitava Gupta, Bethesda, Md.

[73] Assignee: Innotech, Inc., Roanoake, Va.

[*] Notice: The term of this patent shall not extend beyond the expiration date of Pat. No. 5,406,341.

[21] Appl. No.: 664,078

[22] Filed: Jun. 13, 1996

Related U.S. Application Data

[63] Continuation-in-part of Ser. No. 247,201, May 20, 1994, Pat. No. 5,528,321, and Ser. No. 247,199, May 20, 1994, Pat. No. 5,805,266, which is a continuation-in-part of Ser. No. 225,386, Apr. 8, 1994, Pat. No. 5,517,259, which is a continuation-in-part of Ser. No. 216,381, Mar. 23, 1994, Pat. No. 5,598,234, which is a continuation-in-part of Ser. No. 980,053, Nov. 23, 1992, Pat. No. 5,406,341.

[51] Int. Cl.$^6$ ............................................. G02C 7/04
[52] U.S. Cl. ................ 351/177; 351/160 R; 351/160 H; 351/161
[58] Field of Search ............................ 351/160 R, 160 H, 351/161, 162, 177

[56] References Cited

U.S. PATENT DOCUMENTS

| | | | |
|---|---|---|---|
| 3,300,909 | 1/1967 | Cooper et al. | 351/161 |
| 3,360,889 | 1/1968 | Borish | 351/161 |
| 4,955,580 | 9/1990 | Seden et al. | 425/808 |
| 5,114,629 | 5/1992 | Morland et al. | 425/808 |
| 5,129,718 | 7/1992 | Futhey et al. | 351/161 |
| 5,142,411 | 8/1992 | Fiala | 359/494 |
| 5,158,718 | 10/1992 | Thakrar et al. | 425/808 |
| 5,170,192 | 12/1992 | Pettigrew et al. | 351/161 |
| 5,191,366 | 3/1993 | Kashiwagi | 351/177 |
| 5,391,589 | 2/1995 | Kiguchi et al. | 351/177 |
| 5,404,183 | 4/1995 | Seidner | 351/177 |
| 5,406,341 | 4/1995 | Blum et al. | 351/160 |
| 5,517,259 | 5/1996 | Blum et al. | 351/160 |
| 5,528,321 | 6/1996 | Blum et al. | 351/160 |

FOREIGN PATENT DOCUMENTS

WO94/12909  6/1994  WIPO.

OTHER PUBLICATIONS

Contacto, Jan. 1976; pp. 31–35; Kandall, C.A.: *Ultrafocal® Bifocal Contact Lens.*

Primary Examiner—Scott J. Sugarman

[57] ABSTRACT

A method for providing a contact lens for a patient. According to this method, an optical preform is selected, and a resting position of the optical preform on the patient's eye is determined. An optical feature is also located on a patient's eye. Then, a reference position is located on the surface of the optical preform coincident with the optical feature on the patients eye, when the optical preform is in the resting position. Finally, the optical modification is provided on the optical preform at a location based on the reference position on the optical preform, either by machining the preform itself or by machining a mold that is subsequently used to form the lens.

22 Claims, 4 Drawing Sheets

METHOD OF MANUFACTURING CONTACT LENSES

This application is a continuation-in-part of U.S. Ser. No. 08/247,201, May 20, 1994, U.S. Pat. No. 5,528,321 and U.S. Ser. No. 08/247,199, May 20, 1994 U.S. Pat. No. 5,805,266, each of which is a continuation-in-part of U.S. Ser. No. 08/225,386, Apr. 8, 1994, U.S. Pat. No. 5,517,259, which is a continuation-in-part of U.S. Ser. No. 08/216,381, Mar. 23, 1994, U.S. Pat. No. 5,598,234, which is a continuation-in-part of U.S. Ser. No. 07/980,053, Nov. 23, 1992, U.S. Pat. No. 5,406,341.

BACKGROUND OF THE INVENTION

The present invention relates generally to methods for manufacturing contact lenses, and more particularly to methods for manufacturing finished aspheric single vision contact lenses, or finished spherical or aspheric multifocal contact lenses.

As used herein, the term "multifocal" is used to generally refer to bifocal contact lenses, trifocal contact lenses, progressive contact lenses, and so forth.

While contact lenses are worn by over 10% of all antimetropes in the U.S., multifocal contact lenses have enjoyed only a mixed success. No multifocal contact lens has been successfully accepted by more than 70% of the patients fitted with a particular design.

Currently available multifocal contact lenses are designed based on the assumption of an exact fit. An exact fit as defined herein means that the contact lens will be centered with respect to the center of the patient's pupil. In practice, however, since contact lenses are made with a limited number of concave curvatures, the fit is almost never exact for an individual patient. Instead, the contact lens positions itself on the cornea at a position determined by the difference between the curvature of the cornea and the curvature of the contact lens. The relationship between the lens and the cornea is also affected somewhat by other factors such as lid tension, tear rate and so forth.

So long as the lens is of a single vision type, this accentricity between the pupil and contact lens is too small to cause any significant change in the refractive correction provided by the lens. However, patients wearing other types of lenses such as bifocal contact lenses can suffer a significant loss of visual acuity or contrast due to this accentricity. This loss of visual performance of bifocal contact lenses can occur in every bifocal design, although the deleterious effects of decentration on visual acuity as a function of contrast may be mitigated to some extent by centered diffractive bifocal designs. Therefore, lack of perfect fit, which leads to decentration of the lens, is the leading cause of patient maladaptation to bifocal contact lenses, whether made of soft hydrophilic materials or of hard gas permeable materials.

One solution to the above problem as recognized by the inventors is to provide the patient with a lens having a perfect fit. A perfect fit, however, requires a perfect match between the corneal curvature and the concave curvature of the contact lens. The corneal curvature of each individual is unique, and often has zones of pronounced asphericity. Therefore, it is not practical to stock lenses matching all possible corneal topographies. Moreover, there are also problems associated with customizing the concave surface of each contact lens based on the corneal curvature, because altering the concave curvature would change the optical characteristics, i.e., the spherical power or astigmatic correction, provided by the lens.

The reason why the add power zone should be within the pupillary aperture is that for a multifocal lens to function properly, the retina should receive all the images at the same time. For distant objects, the image formed by the base power zone is focused, while the image formed by the add power zone is defocused. For near objects, the image formed by the base power zone is defocused, while the image formed by the add power zone is focused. Given one focused and one or more defocused images, the image processing apparatus at the retina and the visual cortex rejects the unfocused images and processes the focused image.

Persons with normal accommodation not requiring any refractive correction also receive multiple images simultaneously at their retina, and possess the ability to ignore the defocused image of far objects when looking at near objects, and vice versa. This analogy to a normal eye indicates that for a multifocal contact lens to work properly, the add power zone should be within the pupillary aperture. Since image strength at the retina is proportional to the area of the corresponding refractive zone (i.e., add or base power) subtended at the pupil, the optimum area of the add power zone can be computed with respect to the pupil size. It is known that pupil size varies from person to person and also depends on the level of ambient illumination and physicochemical status of the individual. For example, the pupil size of a thirty year old can vary from 2.2 mm in direct sunlight to 5.7 mm outdoors at night. Data on pupil size distributions by age and illumination level are available in the literature. The assumption may also be made that the contact lens wearer will generally be outdoors when experiencing extreme levels of illumination, where distance vision will be needed the most, whereas ambient illumination is at an intermediate level indoors, where near and intermediate vision is required most often. Based on these considerations, it is possible to develop a model which predicts the optimum sizes of add power zones for near vision, base power zones for distance vision and aspheric zones for intermediate vision, if needed. Such a model is disclosed in U.S. Pat. No. 5,112,351.

When positioning a multifocal segment on the patients eye, it is typically sufficient to locate the multifocal segment within the pupillary aperture based on the center of the patients pupil. However, it is sometimes desirable to locate the multifocal segment based on the line of sight, or based on some other optical feature of interest. For example, although the line of sight of the eye tends to correlate to the center of the patients pupil, the line of sight can nonetheless deviate from the pupil center in some cases. In cases where the line of sight deviates from the center of pupil, it is useful to position the multifocal portion of the contact lens with respect to the line of sight, rather than the center of the pupil.

In other circumstances, it is also useful to position the toric surface of a contact lens with respect to the pupillary center or the line of sight of an astigmatic user. For example, for best adaptation, it is preferable to orient the axis of the astigmatic correction of toric contact lens at right angles to the corneal asphericity at the rest or equilibrium position of the lens on the patient's eye. Moreover, it is desirable that these axes cross at the center of the pupil or at the line of sight, for example.

Thus, in view of the above, there is a need for a contact lens where the add power zone or toric zone is precisely positioned with respect to an optical feature associated with the patient's eye, and for a process for making the same.

SUMMARY OF THE INVENTION

The present invention meets the above needs by providing a novel method for manufacturing novel multifocal and/or aspheric contact lenses. According to an embodiment of the present invention, the location of an optical feature on the patient's eye, such as the center of the pupil or the line of sight, is identified. An optical preform is also selected, and a position on the surface of the optical preform is determined that corresponds to the location of the optical feature when the optical preform is stabilized on the corneal surface of the patient's eye.

Then an optical modification is provided on the contact lens, for example, by machining or by casting. The optical modification can be, for example, a multifocal add power zone or a toric zone or both. The optical modification can be cast or machined on the concave or convex surface of the optical preform, or on the concave or convex surface of a mold which is subsequently used to form the contact lens.

According to an embodiment of the invention, the position on the surface of the optical preform corresponding to the optical feature is determined by fitting the patient with an optical preform and directly observing the position on the surface of the optical preform corresponding to the optical feature. According to another embodiment, the position on the surface of the optical preform corresponding to the optical feature is determined by mapping the topography of the patient's cornea. Based on this information the position of the optical preform on the eye can be predicted. At the same time, the position of the optical feature of interest with respect to the eye is determined. Using this information, the position of the optical feature of interest with respect to the optical preform can be calculated without actually fitting the patient with the preform of interest.

In some instances, the rotation of the lens may not stabilize on the cornea to a suitable degree. Lens rotation is undesirable in a number of circumstances, including toric lenses and non-centrosymmetric multifocal lenses. Thus, it is often desirable to stabilize the contact lens, either prior to placing the lens on the patient or after rotation is observed on the cornea of the patent. A preferred method of providing rotation stabilization is by means of prism wedges or weights that are cast or machined near the periphery of the optical preform or cast or machined near the periphery of a mold that is used to form a contact lens.

According to an embodiment of the invention, the above modifications to the lens preform are provided by machining the lens preform and/or mold to form the distance power, add power and/or toric zone and to form the optional prism wedges or weights if desired.

Various other embodiments and advantages of the methods of the present invention and lenses made thereby will be further evident from the detailed description of certain embodiments below and from the appended claims. The appended claims are hereby incorporated by reference as an enumeration of the above and further preferred embodiments. All patent applications, patents, and other disclosures referenced in this specification are hereby incorporated by reference in their entirety.

DETAILED DESCRIPTION OF THE INVENTION

Figure 1:
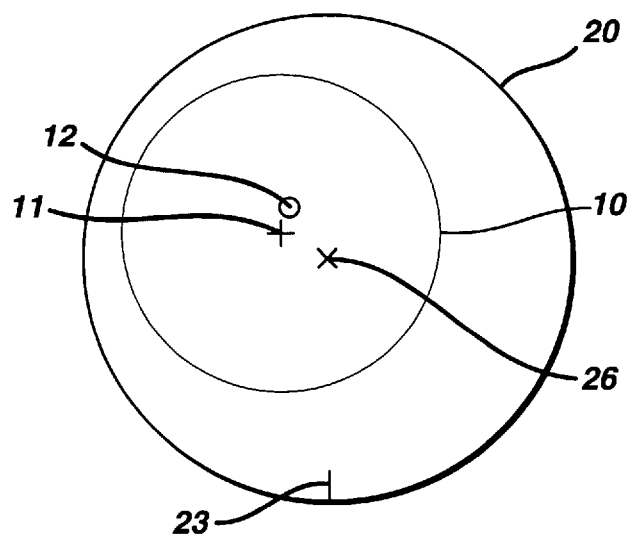
FIG. 1 is a plan view of the a spherical, rigid, gas permeable lens situated on a patient's cornea.

According to an embodiment of the invention, a contact lens is provided in the following fashion. An appropriate optical preform is selected and the location of an optical feature (such as the center of the patient's pupil, the patient's line of sight and so forth) is identified with respect to the patient's eye. A position on the surface of the optical preform that corresponds to the optical feature, when the optical preform is stabilized on the surface of the patient's eye, is also determined. Then, an optical modification, such as a multifocal zone or a toric region or both is provided on the optical preform, based on the position on the surface of the optical preform that corresponds to the optical feature.

If a multifocal zone is to be added, the multifocal zone is preferably designed to fit within the pupillary aperture under light conditions corresponding to conditions where the multifocal characteristics of the lens are to be utilized.

The preform is desirably fabricated from a hydrophilic polymer with low to high water content or a rigid hydrophobic gas permeable material with a high oxygen permeability (e.g., Dk/1>45). It may also be desirable to form the optical preform from a material that is transparent to ultraviolet radiation in the wavelength range of 320–400 nm, providing at least 80% transmission.

The method of the present invention may employ a preform that consists of a cross-linked, hydrophilic network, with water uptake ranging from 37% to 75%, composed of a mixture of acrylates, methacrylates, vinyl carbazoles, at least some of which carry hydroxy or amino substitutes, e.g., hydroxyethyl methacrylate, or N- or C-methyl vinyl carbazole, N,N-dimethylamino ethyl methacrylate, as well as hydrophobic acrylates, methacrylate or vinyl compounds, such as methyl methacrylate, ethyl methacrylate, propyl methacrylate, ethyl acrylate, butyl acrylate, styrene, substituted styrenes and, without limitation, other monomers commonly used in contact lens manufacturing.

Another type of preform that may be employed is a preform formed from a rigid gas permeable material such as a cross-linked siloxane. The network preferably incorporates appropriate cross-linkers such as N, N'-dimethyl bisacrylamide, ethylene glycol diacrylate, trihydroxy propane triacrylate, pentaerythritol tetraacrylate and other similar polyfunctional acrylates or methacrylates, or vinyl compounds, such as N-methylamino divinyl carbazole.

Thus, while the use of hydrophilic polymers may be recommended in view of their superior biocompatibility, the method of fabricating the contact lenses of the present invention as described herein is fully applicable to any other type of optical preform, such as rigid, gas permeable contact lenses fabricated from acrylic terminated siloxanes or rigid PMMA contact lenses.

If a multifocal zone, such as a bifocal, trifocal or progressive zone is to be provided, then the optical preform can be selected to have no correction, distance correction, astigmatic correction, both distance and astigmatic correction, and so forth. If a toric zone is to be provided, then the optical preform can be selected to have no correction, distance correction, multifocal correction, both distance and multifocal correction, and so forth. If both astigmatic and multifocal corrections are to be provided, then the optical preform can be selected to have no correction, distance correction and so forth.

The spherical power range of commercially available optical preforms typically spans 30 diopters in 0.25 D increments, from +15.00 D to −15.00 D. Commercial preforms may also incorporate cylindrical correction in the range of 0.00 D to −5.00 D, in 0.25 D increments. Such optical preforms are preferably provided with a mark on opposing ends of a diameter denoting the direction or the axis of the cylinder, if any is incorporated in the optical preform.

In practicing the method of the present invention, it is desirable to determine the position on the surface of the cornea where the optical preform will stabilize once on the patient's eye. This position can be determined, for example, by simply placing the optical preform on the patient's eye, allowing the contact lens to stabilize and achieve its normal resting position, then locating the position of the optical feature of interest. If the optical modification to be provided is not centrosymmetric with respect to the optical preform, then an additional reference position should be determined. For example, the location of the bottom edge of the lens (i.e., the 270 meridian) can be determined.

Although the location of the optical modification can be referenced from a mark placed on the precursor lens surface after it has been fitted as above, it is also possible to use a custom precursor lens for trial fitting purposes to locate the optical feature of interest, with the custom precursor lens being of the same curvature as the lens to be dispensed.

Still another way of determining the position of the lens is to use a corneal mapping device to map the surface topography of the patient's cornea. One such device, the Corneal Analysis System model 3, is available from EyeSys Technologies, Houston, Tex. Based on this corneal map, the position of the preform during wear can be predicted. More precise predictions of the position of the optical preform on the cornea during wear can be obtained by taking into account additional factors such as eyelid tension, tear rate of the patient, and the width of the palpebral opening (i.e., the opening between the eyelids) as well as its orientation with respect to the cornea.

In addition to determining the position of the optical preform on the patient's eye, the position of the optical feature of interest is determined with respect to the surface of the optical preform. Optical features of interest include the center of patient's pupil and the line of sight of the patient's eye (which is within the pupillary aperture, but not necessarily at the center of the pupil).

According to an embodiment of the invention, the position of the optical feature, such as the pupil's center, and any other reference position chosen can then be physically marked on the anterior or convex side of the optic. Of course, no physical mark need be made. For example, the lens can be observed through a transparent grid which is used as a yardstick to measure the position of the surface of the optical preform that corresponds to the optical feature of interest as well as that of any other reference position chosen (e.g., in cartesian or polar coordinates).

The patient's line of sight is defined as the line from a fixation point (point of focus) to the center of the entrance pupil and from the center of the exit pupil to the fovea. Once the line of sight is determined, the point where the line of sight enters the cornea can be determined. The line of sight is a relevant optical axis because it represents the central or chief ray of the bundle of light passing from the fixation point through the actual optics of the eye to the fovea. Devices are available that can be used to determine the location at which the line of sight enters the cornea. One such device is the Nikon NRK-8000 Auto Ref-Keratometer. The patient's vision is first corrected to best visual acuity. Then, using the eccentric fixation mode of this device, the degree of deviation (e.g., in Cartesian coordinants) between fixation and the pupil center is determined. The point of fixation measured by the device corresponds to the position where the line of sight enters the cornea. Other methods of determining the line of sight will become apparent to those skilled in the art.

In the above embodiments, the center of the center of the pupil or the line of sight was used as a reference point for determining the position on the surface of the optical preform that corresponds to the optical feature of interests. Of course, other reference points are available and will become immediately apparent to those skilled in the art. Moreover, other embodiments for determining the position of the optical preform on the cornea surface and for determining the position of the optical feature on the optical preform will become apparent to those skilled in the art.

Once the position of the optical feature is known with respect to the surface of the optical preform, then the preform is provided with the appropriate optical modification, which can be, for example, a distance zone, a toric zone, an add power zone and/or a stabilizing zone. If a multifocal add power zone is to be employed, either a bifocal-style add zone (e.g., a diffraction bifocal zone, a spherical crescent or flat top configuration) or a progressive-addition-style add power zone may be selected depending on the patient's desires and lifestyle. Preferred methods for providing the optical modification include casting and machining.

When the optical modification provided is using a mold, the mold is preferably machined such that it provides the optical modification at the desired position. For example, the location of the add power zone and/or the toric axis of the contact lens may be provided by producing customized disposable molds and using these disposable molds to surface cast or whole lens cast the contact lenses. Disposable molds are generally fabricated by an injection molding process, using metallic injection molding tools, electroformed from a master mold. The expense and time associated with the process of fabricating a master mold has recently been significantly reduced through the introduction of computer controlled turning machines and mills. The prescription information incorporating the optimum location of the add power zone and/or the toric axis of the final lens can be used to develop and design a toolpath for the custom mold using standard computer aided design processes. The mold is machined and polished, and used directly to fabricate the disposable molds for casting the customized contact lenses. It is anticipated that the mold fabrication process will be completed in a few hours, allowing overall lens fabrication process to take place in one day or less. The master mold can then be set aside after being labeled with the prescription code, so that repeat prescriptions for the same patient can be filled by using the same mold set. Costs of fabricating a submaster are eliminated by this approach, and lens materials and designs which have already been evaluated for clinical safety and efficacy may be used without any change. This approach is expected to significantly shorten the time of introduction of the customized lens.

When appropriate, any of the above modified optical performs can be stabilized against rotation. For example, as noted above, the fitted lens may not stabilize on the cornea of the patient to a suitable degree. In such cases, it may be desirable to stabilize the contact lens, either prior to placing the lens on the patient or after rotation is observed on the cornea of the patent. Observation of rotation on the patient's cornea can be enhanced by means of the mark that is optionally used to designate the location of an optical feature with respect to the preform. Methods of stabilizing contact lenses are known in the art and include weighting, truncation, prism balancing, toric design on the front or back of the lens, and so forth. Stabilization can also be achieved by matching closely the topography of the cornea with the concave surface topography of the contact lens.

According to an embodiment of the invention, the optical modifications (for example, an add power zone and/or a toric zone) and the rotation-stabilizing features are machined into the optical preform or mold at the desired location. Conventional machining methods may be employed to form the modifications of the optical preform or mold.

For example, rigid gas permeable lenses can be machined on a precision CNC lathe or a contact lens milling machine. The optical preform may be blocked onto a precision arbor with a suitable wax which is then mounted in position by a collet on the chuck of the lathe. Alternatively, the lens can be held in place by a vacuum. The location of the center of the lens can serve as a positional guide for the machining process.

Soft hydrophilic contact lenses can also be machined. For example, soft contact lenses can be machined at room temperature at a partially dehydrated state. Or they can be machined after being frozen. Machining of frozen lenses is a well established technology. The frozen lenses can be either partially dehydrated or machined in the fully hydrated state. To carry out the machining process, the lenses are mounted on a collet (for example, with double sided adhesive tape). Then the soft lenses are exposed to a stream of cold, dry nitrogen gas. After the lens freezes, the flow of nitrogen is maintained at a reduced level that is nonetheless adequate to remove the heat generated by the machine process. By maintaining the lens at a constant low temperature, optical distortions in the lenses are minimized.

Figure 2:
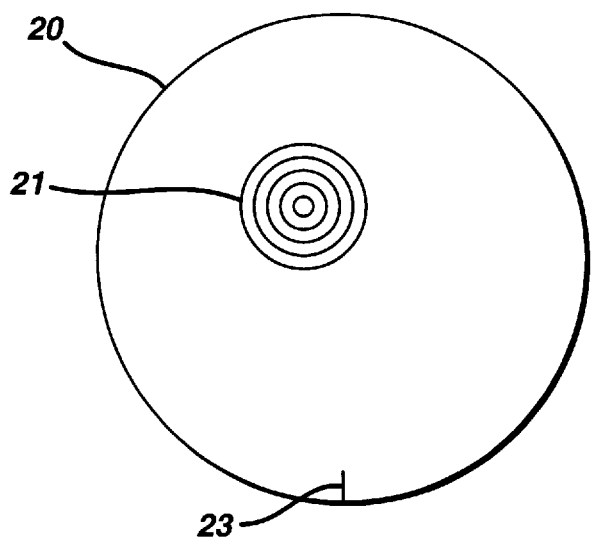
FIG. 2 is a plan view of the lens of FIG. 1, with a diffraction zone positioned with respect to the center of the patient's pupil.

Referring now to the drawings, FIG. 1 shows a plan view of a spherical, rigid, gas permeable lens 20 situated on a patient's cornea over the pupil 10. The location of the pupillary center 11 and the 270° meridian 23 have been marked on the convex surface of the lens. Numeral 26 designates the geometrical center of the lens, and numeral 12 designates the line of sight. FIG. 2 is a plan view of the lens 20 of FIG. 1 after a diffraction bifocal add zone 21 has been machined into the convex surface of the lens. The add zone 21 is centered on the point 12 marking the location of the line of sight of FIG. 1.

Figure 3:
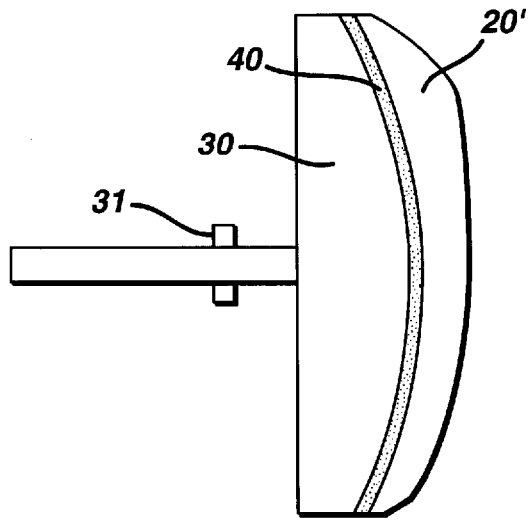
FIG. 3 is a side view of a contact lens mounted on an arbor for machining.
Figure 4:
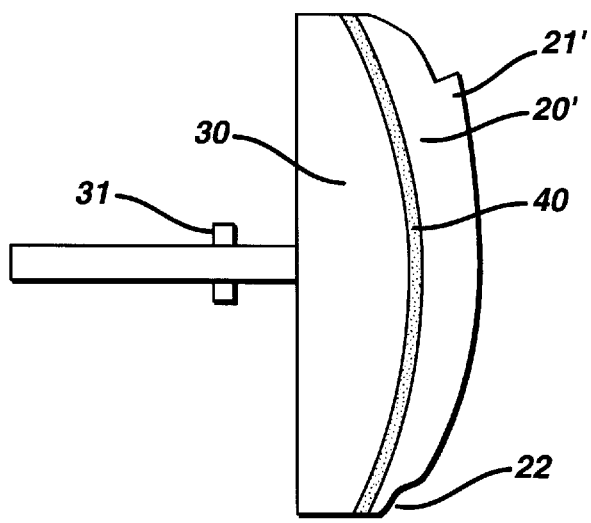
FIG. 4 is a side view of the contact lens of FIG. 3, with a refractive bifocal zone machined on the lens.

FIG. 3 represents a side view of a soft contact lens 20 mounted on an arbor 30 by means of a double sided adhesive tape 40. The curvature of the surface of the arbor 30 is substantially the same as the curvature of the concave surface of the contact lens 20 to avoid any buckling or distortion of the lens 20 as it is cooled down. FIG. 4 is a side view of the lens 20 shown in FIG. 3, mounted as in FIG. 3 with a refractive bifocal zone 21 machined into the convex surface of the lens 20. The presence of a prism wedge 22 can be seen at the 270° meridian.

Figure 5:
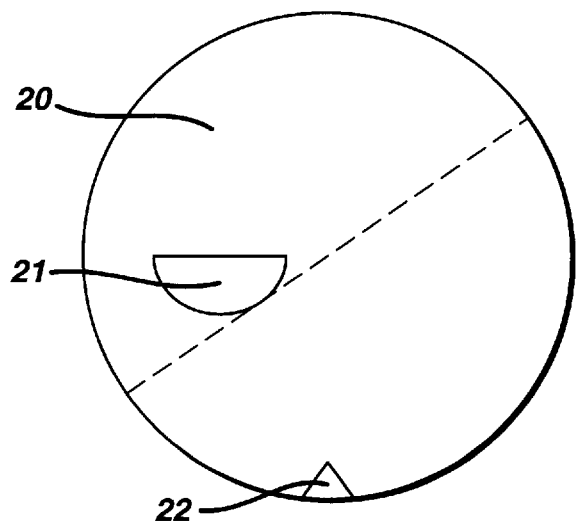
FIG. 5 is a plan view of the lens of FIG. 1 which has been machined to form an astigmatic correction, a bifocal correction and a prism wedge.

FIG. 5 shows a plan view of the rigid gas permeable lens 20 of FIG. 1 which has been machined to form a cylindrical correction at the 45°–135° meridian, such that the cylinder correction axis bisects the pupillary aperture as projected on the lens surface. A bifocal segment 21 and prism wedge 22 have also been machined.

Figure 6:
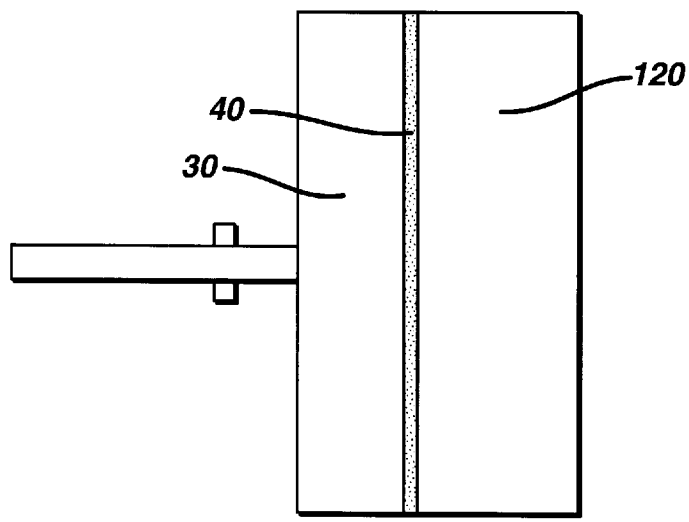
FIG. 6 is a side view of a mold blank mounted on an arbor for machining.
Figure 7:
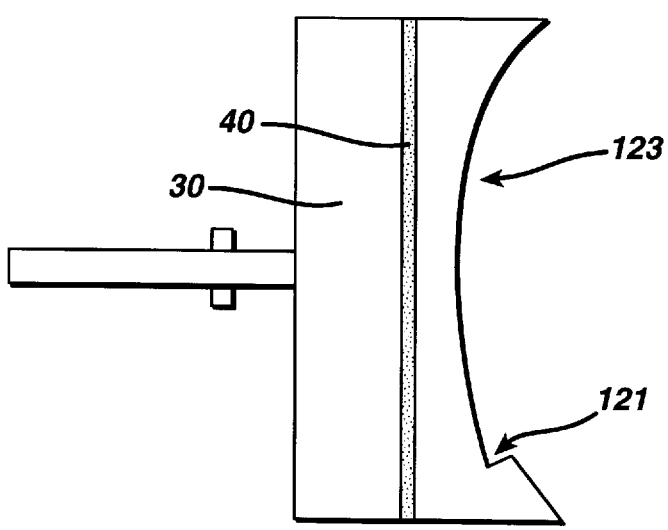
FIG. 7 is a side view of the mold blank of FIG. 6 after machining.

FIG. 6 is a side view of a mold blank 120 mounted on an arbor 30 by means of a double sided adhesive tape 40. FIG. 7 is a side view of mold blank 120 shown in FIG. 6, mounted as in FIG. 6, subsequent to the machining of a mold cavity 123. Except for a region corresponding to a refractive bifocal zone 121, the curvature of the mold substantially matches the curvature of the optical preform. In one embodiment, after applying resin into the mold cavity, the preform is placed on top of the resin, whereupon the resin is cured to provide a cast layer on the surface of the preform. The quantity of resin used is preferably metered such that the region corresponding to the refractive bifocal zone 121 is filled and such that a thin, non-prescription layer is established between the optical preform and mold in the remaining areas. Additional information concerning casting resin layers over contact lenses can be found in U.S. Pat. No. 5,406,341 to Blum and Gupta, the entire disclosure of which is hereby incorporated by reference. In another embodiment the mold is used in whole lens casting.

The above has been a detailed discussion of certain embodiments of the present invention. They should not be considered so as to limit the scope of applicants' invention which is defined by the appended claims.

What is claimed is:

1. A method for providing a contact lens for a patient comprising:

locating an optical feature on a patient's eye;

selecting an optical preform;

determining a resting position of said optical preform when said optical preform is stabilized on the patient's eye to locate a reference position on the surface of the optical preform coincident with the optical feature on the patients eye;

providing a mold by machining; and using said mold to cast a contact lens, said contact lens having an optical modification at a location based on the reference position on the optical preform.

2. The method of claim 1, wherein said contact lens is a single vision contact lens with a multifocal add power zone.

3. The method of claim 1, wherein said contact lens is a single vision lens with a toric zone.

4. The method of claim 1, wherein said contact lens is a toric or astigmatic lens with a multifocal add power zone.

5. The method of claim 1, wherein said mold provides a stabilizing feature on said contact lens.

6. The method of claim 1, wherein said optical feature is the center of the pupil of the patient's eye.

7. The method of claim 1, wherein said optical feature is the line of sight of the patient's eye.

8. The method of claim 1, wherein said step of determining the rest position of the optical preform comprises:

fitting a patient with an optical preform; and observing the position on the surface of the optical preform corresponding to the optical feature.

9. The method of claim 1, wherein said step of determining a rest position of the optical preform is determined without a fitting a trial lens on the patient's eye.

10. The method of claim 1, wherein said optical modification is provided on the convex side of the contact lens.

11. The method of claim 1, wherein said optical modification is provided on the concave side of the contact lens.

12. The method of claim 1, wherein the entirety of said contact lens is cast.

13. The method of claim 1, wherein said mold is used to cast a surface layer on said optical preform.

14. A contact lens having an optical modification provided by casting using a mold that is made by machining, said optical modification being located based on a position of an optical feature on the patients eye relative to the contact lens when the lens is stabilized on the patient's eye.

15. The contact lens of claim 14, wherein said contact lens is single vision contact lens with a multifocal add power zone.

16. The contact lens of claim 14, wherein said contact lens is a single vision lens with a toric zone.

17. The contact lens of claim 14, wherein said contact lens is a toric or astigmatic lens with a multifocal add power zone.

18. The contact lens of claim 14, wherein said mold provides a stabilizing feature on the contact lens.

19. The contact lens of claim 14, wherein said optical modification is provided on the concave side of the contact lens.

20. The contact lens of claim 14, wherein said optical modification is provided on the convex side of the contact lens.

21. The contact lens of claim 14, wherein said optical feature is the center of the pupil of the patient's eye.

22. The contact lens of claim 14, wherein said optical feature is the line of sight of the patient's eye.

* * * * *